United States Patent
Kim et al.

(10) Patent No.: US 9,582,179 B2
(45) Date of Patent: Feb. 28, 2017

(54) APPARATUS AND METHOD FOR EDITING IMAGE IN PORTABLE TERMINAL

(71) Applicant: Samsung Electronics Co. Ltd., Suwon-si, Gyeonggi-do (KR)

(72) Inventors: In-Soo Kim, Seoul (KR); Yong-Seok Kim, Suwon-si (KR); Hyun-Jung Kim, Suwon-si (KR); Ju-Seung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 983 days.

(21) Appl. No.: 13/767,226

(22) Filed: Feb. 14, 2013

(65) Prior Publication Data

US 2013/0212520 A1    Aug. 15, 2013

(30) Foreign Application Priority Data

Feb. 14, 2012  (KR) ........................ 10-2012-0014564

(51) Int. Cl.
| | |
|---|---|
| G06F 3/048 | (2013.01) |
| G06F 3/0488 | (2013.01) |
| G06F 3/0484 | (2013.01) |
| G06T 11/60 | (2006.01) |

(52) U.S. Cl.
CPC ........ *G06F 3/0488* (2013.01); *G06F 3/04845* (2013.01); *G06T 11/60* (2013.01)

(58) Field of Classification Search
CPC .. G06F 3/017; G06F 3/04842; G06F 3/04812; G06F 3/0481
USPC ......... 715/764, 823, 838, 860, 863; 345/619
See application file for complete search history.

(56) References Cited

U.S. PATENT DOCUMENTS

| | | | | |
|---|---|---|---|---|
| 5,513,309 A | * | 4/1996 | Meier ................. | G06F 3/04845 715/860 |
| 6,987,535 B1 | * | 1/2006 | Matsugu ............. | G06F 3/04845 348/239 |
| 8,146,021 B1 | * | 3/2012 | Asente ................ | G06F 3/04845 715/765 |
| 8,271,893 B1 | * | 9/2012 | Tighe ........................... | 715/810 |

\* cited by examiner

*Primary Examiner* — Haoshian Shih
(74) *Attorney, Agent, or Firm* — Jefferson IP Law, LLP

(57) ABSTRACT

An apparatus and a method for editing an image in a portable terminal which can conveniently edit the image are provided. The apparatus for editing the image includes a touch screen unit for displaying an image, and a controller for controlling such that, when one or more edit points are selected from edit points displayed in the image in an image edit mode, an edit function window for editing the selected one or more edit points is displayed.

49 Claims, 20 Drawing Sheets

APPARATUS AND METHOD FOR EDITING IMAGE IN PORTABLE TERMINAL

PRIORITY

This application claims the priority under 35 U.S.C. §119(a) of a Korean patent application filed in the Korean Industrial Property Office on Feb. 14, 2012 and assigned Serial No. 10-2012-0014564, the entire disclosure of which is hereby incorporated by reference.

BACKGROUND OF THE INVENTION

1. Field of the Invention

The present invention relates to an apparatus and a method for editing an image in a portable terminal. More particularly, the present invention relates to an apparatus and a method, which can conveniently edit an image in a portable terminal.

2. Description of the Related Art

Portable terminals have evolved from supporting only one main function to supporting a plurality of various functions. With the diversification of functions of the portable terminal, methods of storing various types of data have been studied and provided. For example, the portable terminal converts an image photographed by a user to data and stores the converted data through a function included in the portable terminal.

Further, the portable terminal provides a function capable of editing the photographed image or applying special effects.

More particularly, the portable terminal equipped with a touch screen can edit a desired image conveniently through a touch action using a finger of a user or a pen.

However, the portable terminal equipped with the touch screen has a disadvantage of deteriorating usability of the portable terminal since, when the user touches a corresponding area of the touch screen with his/her finger in order to edit an image, the desired area may be hidden by the finger and thus a touch of a small part may be difficult.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for editing an image in a portable terminal which can conveniently edit the image.

In accordance with an aspect of the present invention, an apparatus for editing an image in a portable terminal is provided. The apparatus includes a touch screen unit for displaying an image, and a controller for controlling such that, when one or more edit points are selected from edit points displayed in the image in an image edit mode, an edit function window for editing the selected one or more edit points is displayed.

In accordance with another aspect of the present invention, an apparatus for editing an image in a portable terminal is provided. The apparatus includes a touch screen unit for displaying an image, and a controller for controlling such that, when a corresponding edit point is selected from edit points displayed in the image in an image edit mode, one or more edit points are distinguishably displayed through an identifier in an edit area including the corresponding edit point, and for controlling such that, when one or more identifiers are selected in the edit area, an edit function window for editing the selected one or more identifiers is displayed.

In accordance with another aspect of the present invention, an apparatus for editing an image in a portable terminal is provided. The apparatus includes a touch screen unit for displaying an image, and a controller for controlling such that, when a corresponding edit point is selected from edit points displayed in the image in an image edit mode, an edit area including the corresponding edit point is enlarged and the enlarged edit area is displayed as an edit function window.

In accordance with another aspect of the present invention, an apparatus for editing an image in a portable terminal is provided. The apparatus includes a touch screen unit for displaying an image, and a controller for controlling such that, when one or more edit points are selected from edit points displayed in the image, remaining areas of an entire screen area of the touch screen unit except for an edit area including the selected one or more edit points are switched to an edit function area for editing the selected one or more edit points.

In accordance with another aspect of the present invention, a method of editing an image in a portable terminal is provided. The method includes displaying edit points in an image in an image edit mode, and when one or more edit points are selected from the displayed edit points, displaying an edit function window for editing the selected one or more edit points.

In accordance with another aspect of the present invention, a method of editing an image in a portable terminal is provided. The method includes displaying edit points in an image in an image edit mode, when a corresponding edit point is selected from the displayed edit points, distinguishably displaying one or more edit points through an identifier in an edit area including the corresponding edit point, and when one or more identifiers are selected from the edit area, displaying an edit function window for editing the selected one or more identifiers.

In accordance with another aspect of the present invention, a method of editing an image in a portable terminal is provided. The method including displaying edit points in an image in an image edit mode, and when one edit point is selected from the displayed edit points, enlarging an edit area including the corresponding edit point and displaying the enlarged edit area as an edit function window.

In accordance with another aspect of the present invention, a method of editing an image in a portable terminal is provided. The method including displaying edit points in an image in an image edit mode, when one or more edit points are selected from the displayed edit points, extracting remaining areas of an entire screen area of a touch screen unit except for an edit area including the selected one or more edit points, and switching the remaining areas except for the edit area to an edit function area for editing the selected one or more edit points.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
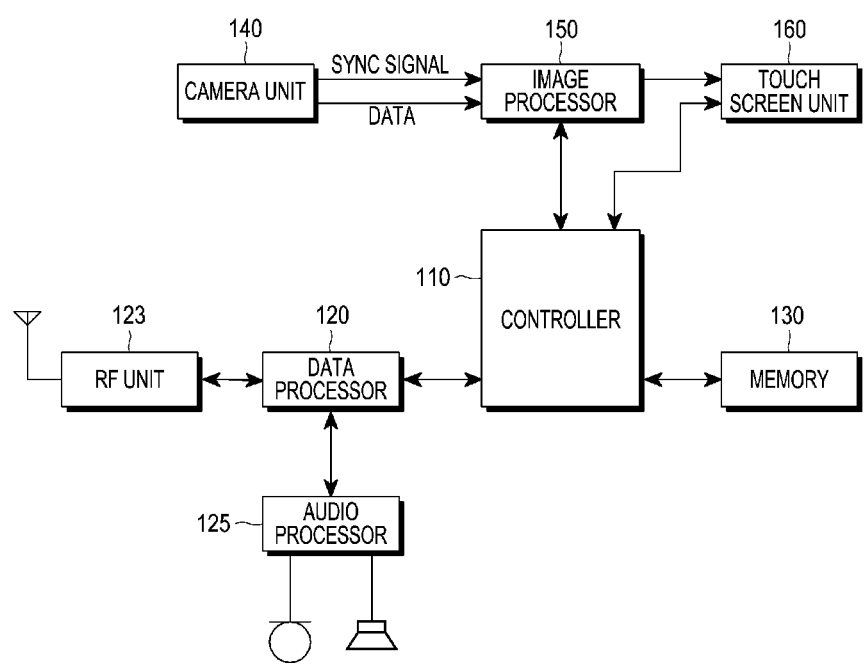
FIG. 1 is a block diagram of a portable terminal according to an exemplary embodiment of the present invention.

FIG. 1 is a block diagram of a portable terminal according to an exemplary embodiment of the present invention.

Referring to FIG. 1, a Radio Frequency (RF) unit 123 performs a wireless communication function of a portable terminal. The RF unit 123 includes an RF transmitter for up-converting and amplifying a frequency of a transmitted signal, and an RF receiver for low noise-amplifying a received signal and down-converting a frequency.

A data processor 120 includes a transmitter for encoding and modulating the transmitted signal, and a receiver for demodulating and decoding the received signal. That is, the data processor 120 may include a modem and a codec. Here, the codec includes a data codec for processing packet data and the like and an audio codec for processing an audio signal such as voice and the like.

An audio processor 125 performs a function of reproducing a reception audio signal output from the audio codec of the data processor 120 or transmitting a transmission audio signal generated from a microphone to the audio codec of the data processor 120.

A memory 130 may include a program memory and data memories. The program memory can store programs for controlling a general operation of the portable terminal and programs for controlling such that a separate edit function window for editing an edit point selected in an image edit mode is displayed according to exemplary embodiments of the present invention. Further, the data memory performs a function of temporarily storing data generated during execution of the programs.

A controller 110 performs a function of controlling a general operation of the portable terminal.

According to exemplary embodiments of the present invention, when a switch to the image edit mode is implemented through the selection of an edit for an image displayed on a touch screen unit 160, the controller 110 controls such that one or more edit areas are extracted from the image, one or more inflection points are extracted from each edit area, and the one or more inflection points are displayed as one or more edit points. Accordingly, when the one or more edit points are selected from edit points displayed on the image in the image edit mode, the controller 110 controls such that the edit function window for editing the selected one or more edit points is displayed.

The edit area used in exemplary embodiments of the present invention refers to an area for distinguishing an image in the image edit mode. For example, a human's face image can be distinguished into eyes, a nose, a mouth, ears, and a facial contour, and the distinguished areas in the image edit mode is referred to as an edit area. Further, the edit point used in exemplary embodiments of the present invention refers to an inflection point in the edit area. The edit point can change an edit area including the edit point by moving a corresponding area in the image edit mode.

According to exemplary embodiments of the present invention, the controller 110 determines that there is a touch detected for a corresponding edit point even when the touch of the corresponding edit area or a virtual selection area including predetermined areas around the corresponding edit area is selected. Accordingly, a user can select a desired corresponding edit point even if the user does not exactly touch the corresponding edit point.

Further, when a touch is detected for one edit point of edit points displayed in the image, the controller 110 controls such that a separate edit function window including a plurality of direction keys for moving the one edit point in a corresponding direction is displayed according to exemplary embodiments of the present invention.

When successive touches are detected for two or more edit points of the edit points displayed in the image, the controller 110 controls such that a separate edit function window including a plurality of direction keys for simultaneously moving the two or more edit points in a corresponding direction is displayed according to exemplary embodiments of the present invention.

The controller 110 controls such that the edit function window is displayed in a position which does not overlap an edit area including the selected edit point.

When the touch is detected for one edit point of the edit points displayed in the image, the controller 110 controls such that the plurality of direction keys for moving the one edit point in the corresponding direction are displayed in corresponding areas of an entire screen area of the touch screen unit, respectively, according to exemplary embodiments of the present invention.

When the successive touches are detected for two or more edit points of the edit points displayed in the image, the controller 110 controls such that the plurality of direction keys for simultaneously moving the two or more edit points in the corresponding direction are displayed in corresponding areas of the entire screen area of the touch screen unit, respectively, according to exemplary embodiments of the present invention.

Further, when a corresponding edit point is selected from the edit points displayed in the image in the image edit mode, the controller 110 distinguishably displays one or more edit points through an identifier in an edit area including the corresponding edit point according to exemplary embodiments of the present invention. The identifier is displayed on the corresponding edit point to distinguish edit points. A touch for selecting the identifier can be the touch of the identifier or a touch of a virtual selection area including the identifier. Furthermore, when one or more identifiers are selected in the edit area, the controller 110 can control such that an edit function window for editing the selected one or more identifiers is displayed.

When a touch is detected for one identifier in the edit area in which the one or more edit points are distinguishably displayed through the identifier, the controller 110 controls such that a separate edit function window including a plurality of direction keys for moving one edit point in a corresponding direction is displayed according to exemplary embodiments of the present invention.

When successive touches are detected for two identifiers in the edit area in which the one or more edit points are distinguishably displayed through the identifier, the controller 110 controls such that a separate edit function window including a plurality of direction keys for simultaneously moving the two or more edit points in a corresponding direction is displayed according to exemplary embodiments of the present invention.

Further, the controller 110 controls such that the edit function window is displayed in a position which does not overlap the edit area in which the one or more edit points are distinguishably displayed through the identifier.

When the touch is detected for one identifier in the edit area in which the one or more edit points are distinguishably displayed through the identifier, the controller 110 controls such that the plurality of direction keys for moving the one edit point in the corresponding direction are displayed in corresponding areas of an entire screen area of the touch screen unit, respectively, according to exemplary embodiments of the present invention.

When the successive touches are detected for two or more identifiers in the edit area in which the one or more edit points are distinguishably displayed through the identifier, the controller 110 controls such that the plurality of direction keys for simultaneously moving the two or more edit points in the corresponding direction are displayed in corresponding areas of the entire screen area of the touch screen unit, respectively, according to exemplary embodiments of the present invention.

Further, when the corresponding edit point is selected from the edit points displayed in the image, the controller 110 controls such that the edit area including the corresponding edit point is enlarged and displayed as the edit function window according to exemplary embodiments of the present invention.

When a touch and a drag are detected in one edit point in the edit function window, the controller 110 controls such that the one edit point is moved in a corresponding drag direction according to exemplary embodiments of the present invention.

When successive touches and drags are detected in two or more edit points, the controller 110 controls such that the two or more edit points are simultaneously moved in a corresponding drag direction according to exemplary embodiments of the present invention.

When one or more edit points are selected from the edit points displayed in the image in the image edit mode, the controller 110 controls such that the remaining areas of the entire screen area of the touch screen unit except for an edit area including the selected one or more edit points are switched to an edit function area for editing the selected one or more edit points according to exemplary embodiments of the present invention. At this time, the controller 110 can control to display the selection of the one or more edit points.

Accordingly, when the touch is detected for one edit point of the edit points displayed in the image, the controller 110 controls such that the selection of the one edit point is distinguishably displayed. When the drag is detected in the edit function area, the controller 110 controls such that the one edit point is moved in a drag direction and displayed.

When the successive touches are detected for two or more edit points of the edit points displayed in the image, the controller 110 controls such that the selection of the two or more edit points is distinguishably displayed. When the drag is detected in the edit function area, the controller 110 controls such that the two or more edit points are simultaneously moved in the drag direction and displayed.

A camera unit 140 photographs image data, and includes a camera sensor for converting a photographed optical signal to an electrical signal and a signal processor for converting an analog image signal photographed by the camera sensor to digital data. Here, it is assumed that the camera sensor is a Charge-Coupled Device (CCD) or a Complementary Metal-Oxide-Semiconductor (CMOS) sensor, and the signal processor may be implemented as a Digital Signal Processor (DSP). Further, the camera sensor and the signal processor may be implemented integrally or separately.

The image processor 150 performs an Image Signal Processing (ISP) for displaying an image signal output from the camera unit 140 on the touch screen unit 160, and the ISP performs functions such as gamma correction, interpolation, spatial change, image effect, image scale, Automatic White Balance (AWB), Automatic Exposure (AE), Automatic Focus (AF) and the like. Accordingly, the image processor 150 processes the image signal output from the camera unit 140 in a unit of frames, and outputs frame image data according to a characteristic and a size of the touch screen unit 160. Further, the image processor 150 includes an image codec, and performs a function of compressing the frame image data displayed on the touch screen unit 160 in a set manner or reconstructing the compressed frame image data to original frame image data. Here, the image codec may be a Joint Photographic Experts Group (JPEG) codec, a Moving Picture Experts Group 4 (MPEG4) codec, a Wavelet codec and the like. It is assumed that the image processor 150 has an On Screen Display (OSD) function, and can output on screen display data according to a screen size displayed under a control of the controller 110.

The touch screen unit 160 displays the image signal output from the image processor 150 on the screen and displays user data output from the controller 110. The touch screen unit 160 may include a display unit and an input unit. At this time, the input unit of the touch screen unit 160 can display a key input unit including function keys for inputting number and character information and function keys for setting various functions.

Further, the touch screen unit 160 displays one or more inflection points extracted from the image to be edited in the image edit mode as the edit points.

An operation of editing the image in the above mentioned portable terminal will be described in detail with reference to FIGS. 2 to 9B.

Figure 2:
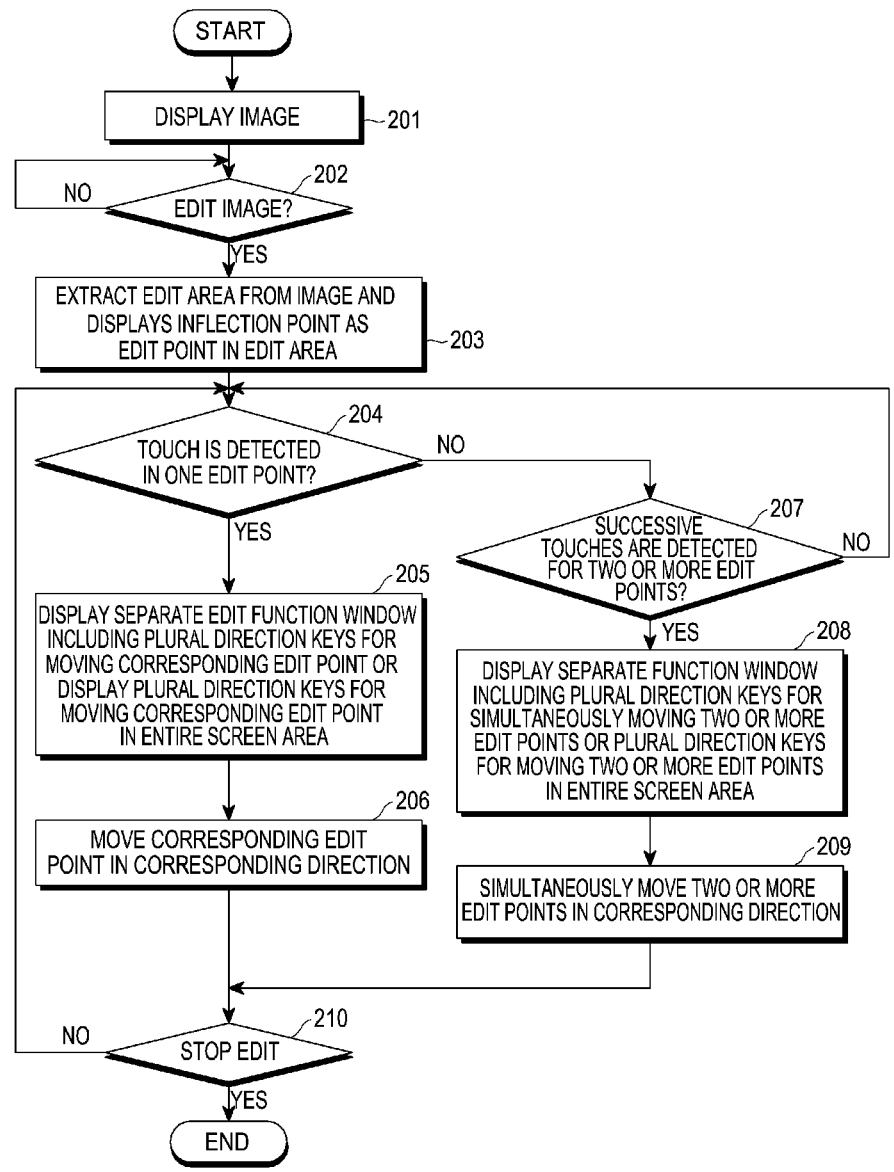
FIG. 2 is a flowchart for editing an image in a portable terminal according to a first exemplary embodiment of the present invention.

FIG. 2 is a flowchart illustrating a process of editing an image in a portable terminal according to a first exemplary embodiment of the present invention.

Hereinafter, the first exemplary embodiment of the present invention will be described in detail with reference to FIG. 2 and FIG. 1.

Referring to FIG. 2, an image is displayed on the touch screen unit 160 in step 201. When an image edit is selected, the controller 110 detects the image edit in step 202. Thereafter, the controller extracts one or more edit areas from the image, extracts one or more inflection points from the extracted edit areas, and displays the extracted one or more inflection points as one or more edit points in step 203.

When a touch is detected for one edit point by the controller 110 in step 204, the controller 110 controls to display a separate edit function window for editing the selected edit point in the touch screen 160 on which the image is displayed in step 205.

At this time, the controller 110 determines a touch detected in a virtual selection area including the selected edit point also as the touch for the edit point.

Further, the edit function window is displayed in a position which does not overlap the edit area including the selected edit point, and displays the selected one edit point and a plurality of direction keys which can move the selected one edit point. The edit point selected by the detection of the touch can be displayed distinguishably from another edit point which is not selected.

Alternatively, the controller 110 can control to display the plurality of direction keys capable of moving the one edit point for which the touch has been detected in the entire area of the touch screen unit 160 and the plurality of direction keys can display each direction key in a corresponding area indicating a corresponding direction in an edge area of the entire area of the touch screen unit 160 in step 205. At this time, the direction key is displayed not to overlap an edit area including the corresponding edit point or displayed transparently.

Accordingly, whenever a touch is detected for a corresponding direction key among the plurality of direction keys displayed in the edit function window or the entire area in step 205, the controller 110 proceeds to step 206 in which the selected one edit point is moved in a corresponding direction for which the touch has been detected in the image and displayed.

For example, when the edit function window is displayed in a right end of the touch screen unit 160 and the selected one edit point and four direction keys around the one edit point are displayed in the edit function window, the one edit point can be moved in a right direction in the image and displayed whenever a right direction key is touched and selected from the four direction keys. Alternatively, when four direction keys are displayed in respective four direction edges of the touch screen unit, the one edit point can be moved in a right direction in the image and displayed whenever a right direction key is touched and selected from the four direction keys.

Accordingly, whenever one edit point to be edited is selected, the plurality of direction keys for moving the selected one edit point can be displayed in the edit function window or the entire area of the touch screen unit through steps 204 to 206.

Further, when successive touches are detected for two or more edit points displayed in step 203, the controller 110 detects the successive touches in step 207 and proceeds to step 208 to display a separate edit function window for editing the selected two or more edit points in the touch screen unit 160 in which the image is displayed. At this time, the controller 110 determines a touch detected in a virtual selection area including each of the two or more edit points as the touches detected for the two or more edit points. Further, the separate edit function window for editing the selected two or more edit points includes a plurality of direction keys which can simultaneously move the two or more edit points.

Alternatively, the controller 110 can control to display the plurality of direction keys capable of simultaneously moving the two or more edit points for which the touches have been detected in the entire area of the touch screen unit 160 in step 208, and the plurality of direction keys can display each direction key in a corresponding area indicating a corresponding direction in an edge area of the entire area of the touch screen unit 160. At this time, the direction key is displayed not to overlap an edit area including the corresponding edit point or displayed transparently.

Accordingly, whenever a touch and a drag are detected for a corresponding direction key among the plurality of direction keys displayed in the edit function window or the entire area of the touch screen unit 160 in step 208, the controller 110 proceeds to step 209 to simultaneously move the two or more edit points in a corresponding direction for which the touch and the drag have been detected and to display the moved edit points.

For example, when the edit function window is displayed in a right end of the touch screen unit 160 and the selected two or more edit points and four direction keys around the two or more edit points are displayed in the edit function window, the two or more edit points can be simultaneously moved in a right direction in the image and displayed whenever a right direction key is touched and selected from the four direction keys. Alternatively, when the four direction keys are displayed in respective four direction edges of the touch screen unit 160, the two or more edit points can be simultaneously moved in a right direction in the image and displayed whenever a right direction key is touched and selected from the four direction keys.

Accordingly, when two or more edit points to be edited are selected through touch detection, the plurality of direction keys for simultaneously moving the selected two or more edit points are displayed in the edit function window or the entire area of the touch screen unit through steps 207 to 209.

If termination of the edit is selected during the above process, the controller 110 detects the termination in step 210 and stops the image edit mode.

Figure 3:
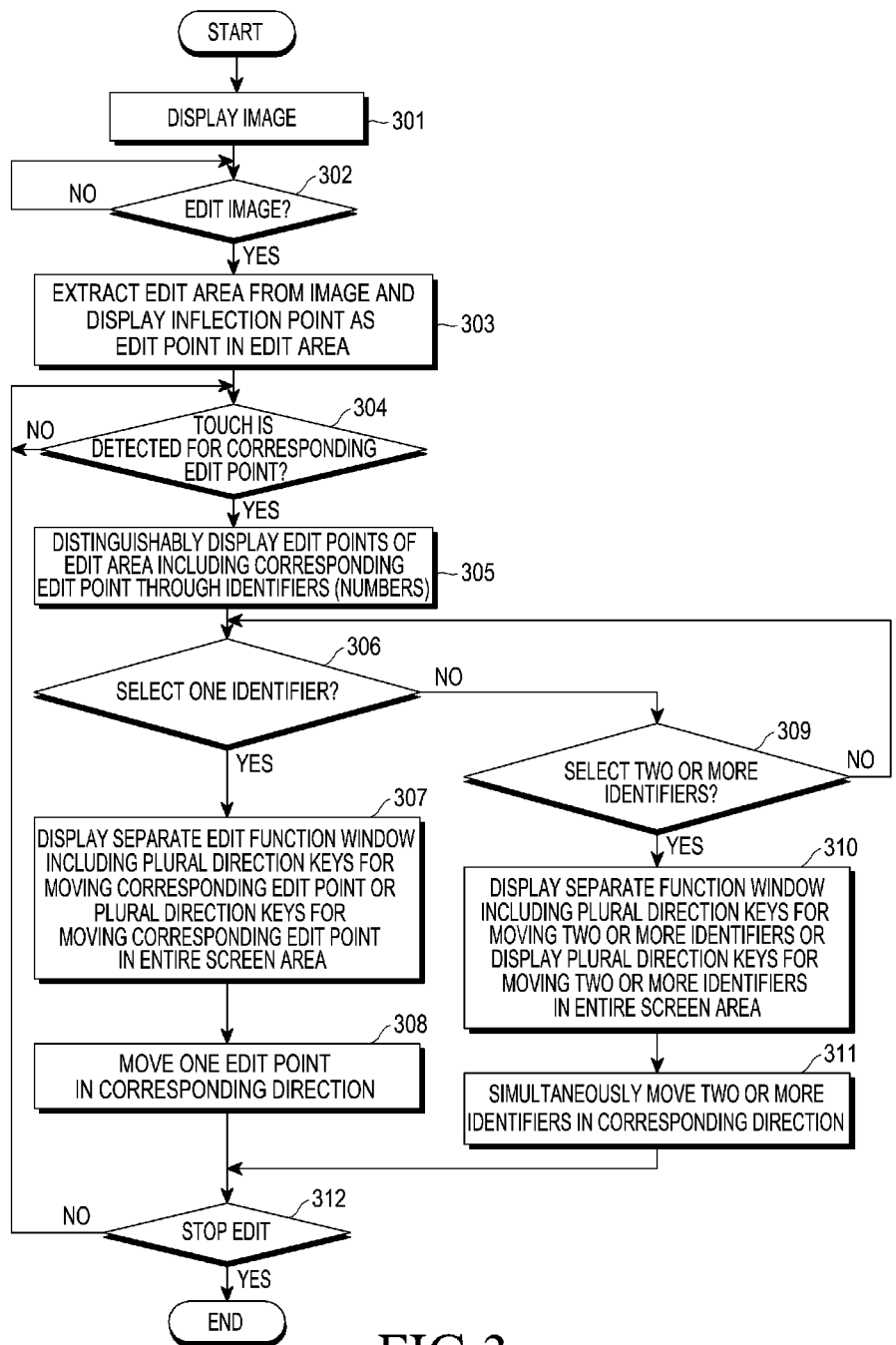
FIG. 3 is a flowchart illustrating a process of editing an image in a portable terminal according to a second exemplary embodiment of the present invention.

FIG. 3 is a flowchart illustrating a process of editing an image in a portable terminal according to a second exemplary embodiment of the present invention, and FIGS. 6A to 6G and FIGS. 7A to 7D are diagrams for describing the process of FIG. 3.

Hereinafter, the second exemplary embodiment of the present invention will be described in detail with reference to FIG. 3 and FIG. 1.

Referring to FIG. 3, an image is displayed in the touch screen unit 160 in step 301. When an image edit is selected, the controller 110 detects the image edit in step 302. Thereafter, the controller 110 extracts one or more edit areas from the image, extracts one or more inflection points from the extracted edit areas, and controls to display the extracted one or more inflection points as edit points in step 303.

When a touch is detected for the corresponding edit point by the controller 110 in step 304, the controller 110 proceeds to step 305 to control to distinguishably display, through an identifier, all edit points of an edit area including the corresponding edit point selected by the touch.

When a touch is detected for one identifier or a touch is detected in a virtual selection area including the identifier in the edit area in which edit points are indicated by identifiers in step 305, the controller 110 detects the touch in step 306 and proceeds to step 307 to control to display a separate edit function window for editing the selected identifier in a predetermined area of the touch screen unit 160 in which the image is displayed. At this time, if the identifier is a number, the identifier can be selected through a key input.

The edit function window is displayed in a position which does not overlap the edit area including the selected identifier, and displays the selected identifier and a plurality of direction keys which can move the selected identifier.

Alternatively, the controller 110 can control to display a plurality of direction keys which are capable of moving the identifier for which the touch has been detected in the entire area of the touch screen unit 160 and the plurality of direction keys can display each direction in a corresponding area indicating a corresponding direction in an edge area of the entire area of the touch screen unit 160 in step 307. At this time, the direction key is displayed not to overlap an edit area including the corresponding edit point or is displayed transparently.

Accordingly, whenever a touch is detected for a corresponding direction key among the plurality of direction keys displayed in the edit function window or the entire area in step 307, the controller 110 proceeds to step 308 to move an edit point corresponding to the selected identifier in a direction corresponding to a corresponding direction key for which the touch has been detected in the image and controls to display the moved edit point.

Whenever an identifier indicating one edit point to be edited in the image is selected, the plurality of direction keys for moving the selected identifier can be displayed in the edit function window or the entire area of the touch screen unit through repeatedly performing steps 306 to 308.

Figure 6A:
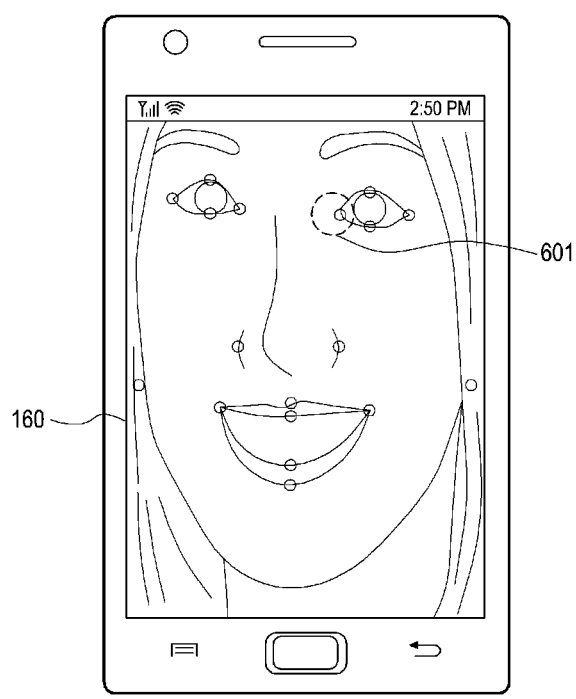
FIGS. 6A to 6G and FIGS. 7A to 7D are diagrams for describing the process of FIG. 3 according to an exemplary embodiment of the present invention.

Steps 306 to 308 are described through FIGS. 6A to 6G. In FIG. 6A one or more edit points included in each of one or more edit areas such as eyes, a nose, a mouth, and a facial contour in an image displaying a human's face are displayed on the touch screen 160 in the image edit mode. At this time, FIG. 6A shows a virtual selection area 601 including predetermined areas around one particular edit point among edit points included in an eye edit area.

Figure 6B:
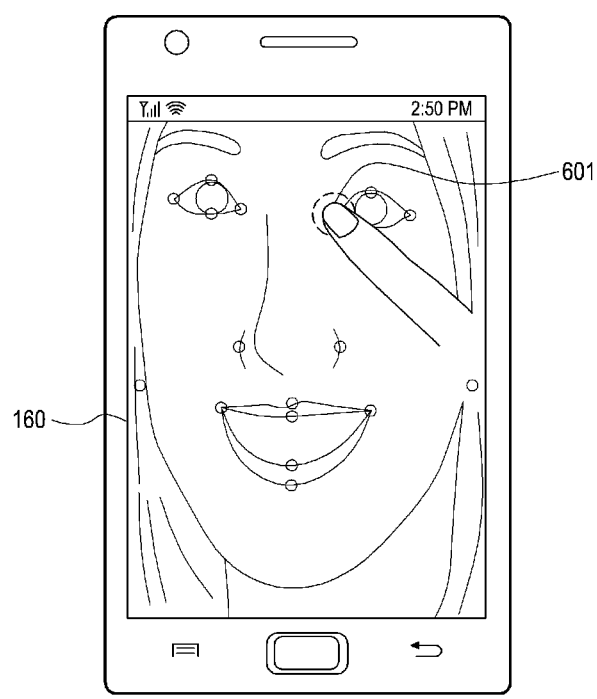

When a touch is detected in the virtual selection area on the touch screen 160 as shown in FIG. 6B, the controller 110 determines the touch as a touch for the particular edit point included in the virtual selection area 601 in which the touch has been detected, and controls to distinguishably display all edit points of the eye edit area 610 including the particular edit point in which the touch has been detected by using number identifiers.

Figure 6C:
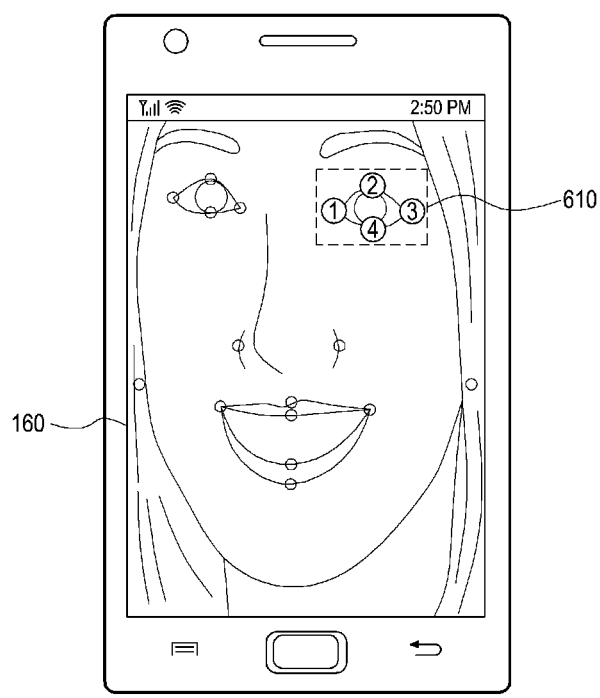
Figure 6D:
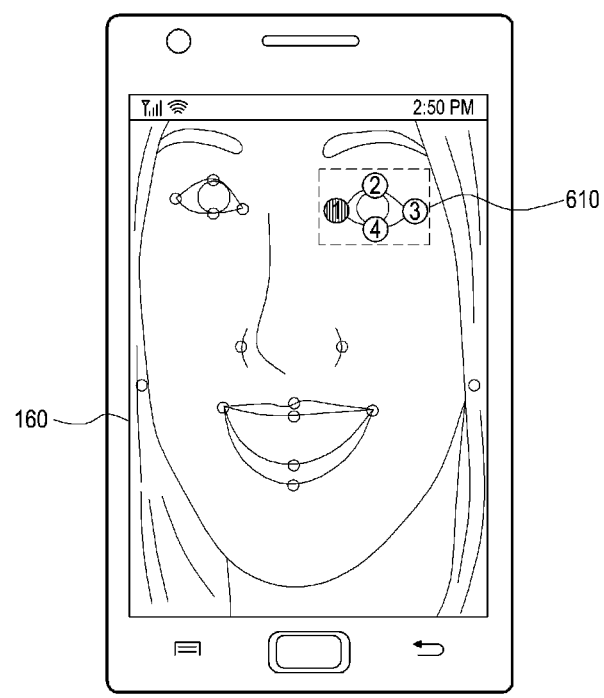
Figure 6E:
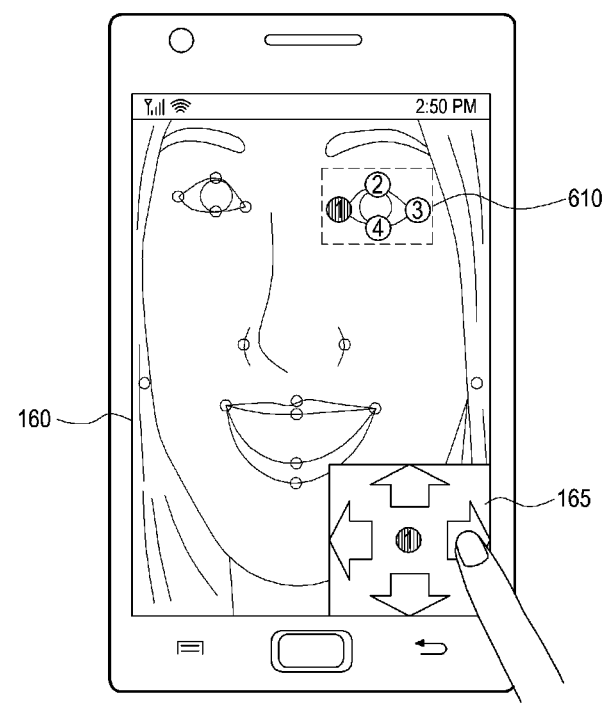

When a touch is detected in a number "1" of the eye edit area 610 in FIG. 6C, the controller 110 controls to distinguishably display the selection of the number "1" in which the touch has been detected (e.g., by using a color) as shown in FIG. 6D, and controls to display a separate edit function window 165 for editing the number "1" in a right lower end of an entire area of the touch screen 160 as shown in FIG. 6E.

Figure 6F:
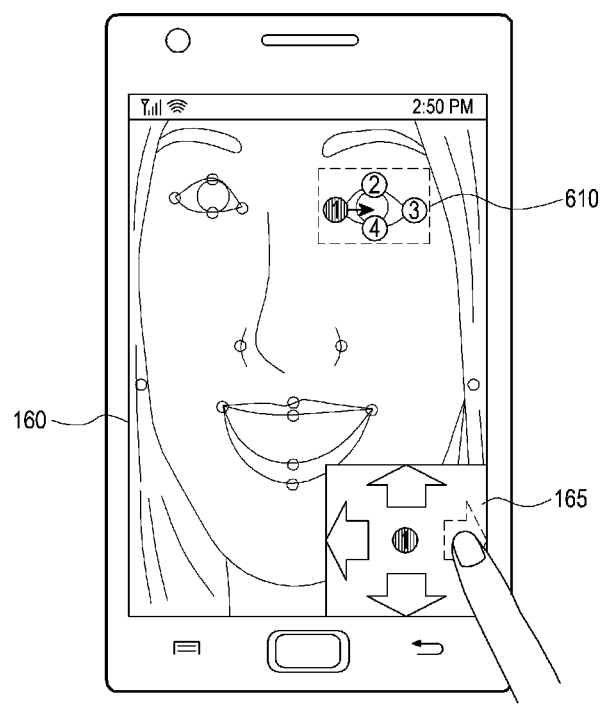

Further, when a touch action is detected for a right direction key among four direction keys for moving the number "1" in the edit function window 165 as shown in FIG. 6F, the edit point corresponding to the number "1" in the eye edit area 610 of the image is moved in a right direction.

Figure 6G:
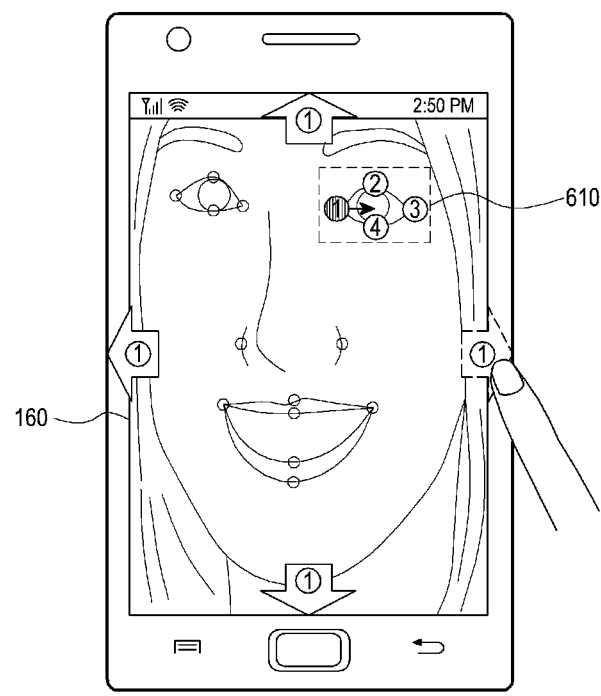

Alternatively, when the touch is detected in the number "1" of the eye edit area 610 in FIG. 6C, the controller 110 controls to distinguishably display the selection of the number "1" in which the touch has been detected (e.g., by using a color) as shown in FIG. 6D, controls to display four direction keys for editing the number "1" in each edge of top, bottom, left, and right parts of the entire area of the touch screen 160 as shown in FIG. 6G, and controls to display the number "1" in each direction key. Accordingly, when a touch action is detected in the right direction key among the four direction keys displayed in the entire area, the edit point corresponding to the number "1" in the eye edit are 610 of the image is moved in a right direction.

Referring back to FIG. 3, when touches are detected for two or more identifiers or a touch is detected in a virtual selection area including each of the two or more identifiers in an edit area in which edit points are indicated by identifiers in step 305 of FIG. 3, the controller 110 detects the touch in step 309 and proceeds to step 310 to control to display a separate edit function window for editing the selected two or more identifiers in the touch screen unit 160 in which the image is displayed. The edit function window displays the selected two or more identifiers. Also, a plurality of direction keys which can simultaneously move the selected two or more identifiers are displayed.

Alternatively, the controller 110 can control to display a plurality of direction keys which can simultaneously move two or more identifiers for which the touches have been detected in the entire area of the touch screen unit 160 in step 310 and the plurality of direction keys can display each direction in a corresponding area indicating a corresponding direction in an edge area of the entire area of the touch screen unit 160. At this time, the direction key is displayed not to overlap an edit area including the corresponding edit point or is displayed transparently.

Accordingly, whenever a touch is detected for a corresponding direction key among the plurality of direction keys displayed in the edit function window or the entire area in step 310, the controller 110 proceeds to step 311 to simultaneously move the two or more identifiers in a corresponding direction for which the touches have been detected in the image and controls to display the moved identifiers.

Whenever two or more identifiers to be edited are selected, the plurality of direction keys for moving the selected two or more identifiers can be displayed in the edit function window or the entire area of the touch screen unit through steps 309 to 311.

Figure 7A:
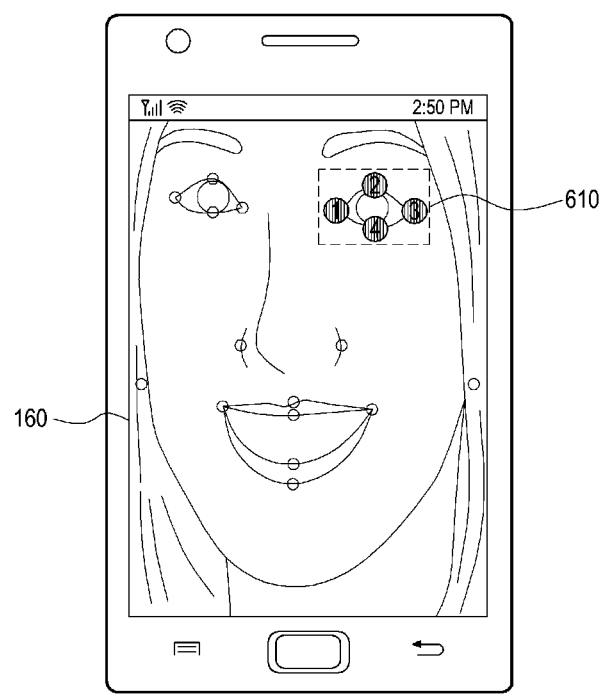
Figure 7B:
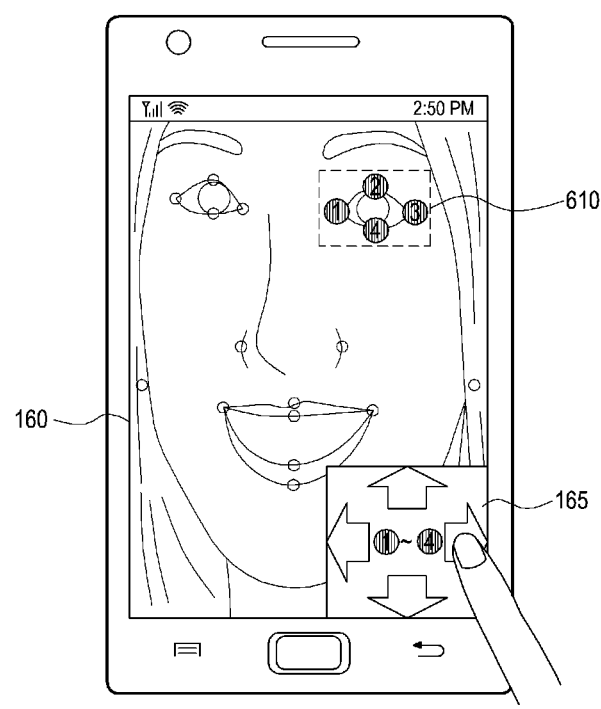

Steps 309 to 311 are described through FIGS. 7A to 7D. When all edit points distinguished by number identifiers are selected through successive touches in the eye edit area 610 on the touch screen 160, the controller 110 distinguishes selections of numbers "1" to "4" in which the successive touches have been detected (e.g. by using colors) as shown in FIG. 7A, and controls to display the separate edit function window 165 for editing the numbers "1" to "4" in a right lower end of the entire area of the touch screen 160 as shown in FIG. 7B.

Figure 7C:
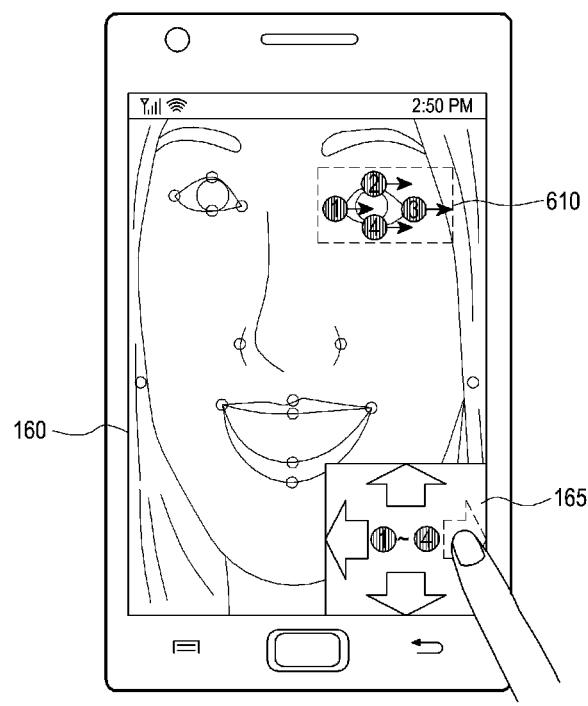

Further, when a touch action is detected in a right direction key among four direction keys for simultaneously moving the numbers "1" to "4" in the edit function window 165, the controller 110 moves edit points corresponding to the numbers "1" to "4" in the eye edit area 610 of the image in a right direction as shown in FIG. 7C.

Figure 7D:
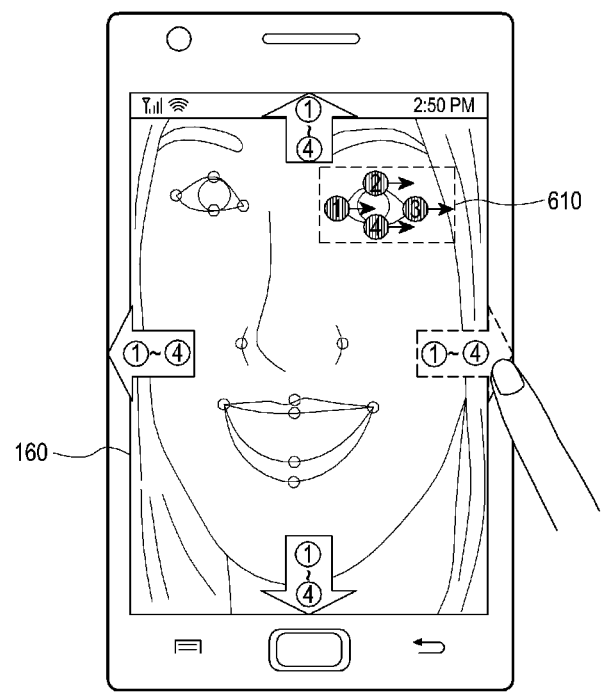

Alternatively, when all edit points distinguished by number identifiers are selected through successive touches in the eye edit area 610, the controller 110 distinguishes selections of the number "1" to "4" in which the successive touches have been detected (e.g., by using colors), controls to display four direction keys for simultaneously moving the numbers "1" to "4" in each edge of top, bottom, left, and right parts of the entire area of the touch screen 160 as shown in FIG. 7D, and controls to display the numbers "1" to "4" in the four direction keys, respectively. Accordingly, when a touch action is detected in a right direction key among the four direction keys displayed in the entire area, the controller 110 simultaneously moves edit points corresponding to the numbers "1" to "4" in the eye edit area of the image in a right direction.

When termination of the edit is selected during the above process, the controller 110 detects the edit termination in step 312 and stops the image edit mode.

Figure 4:
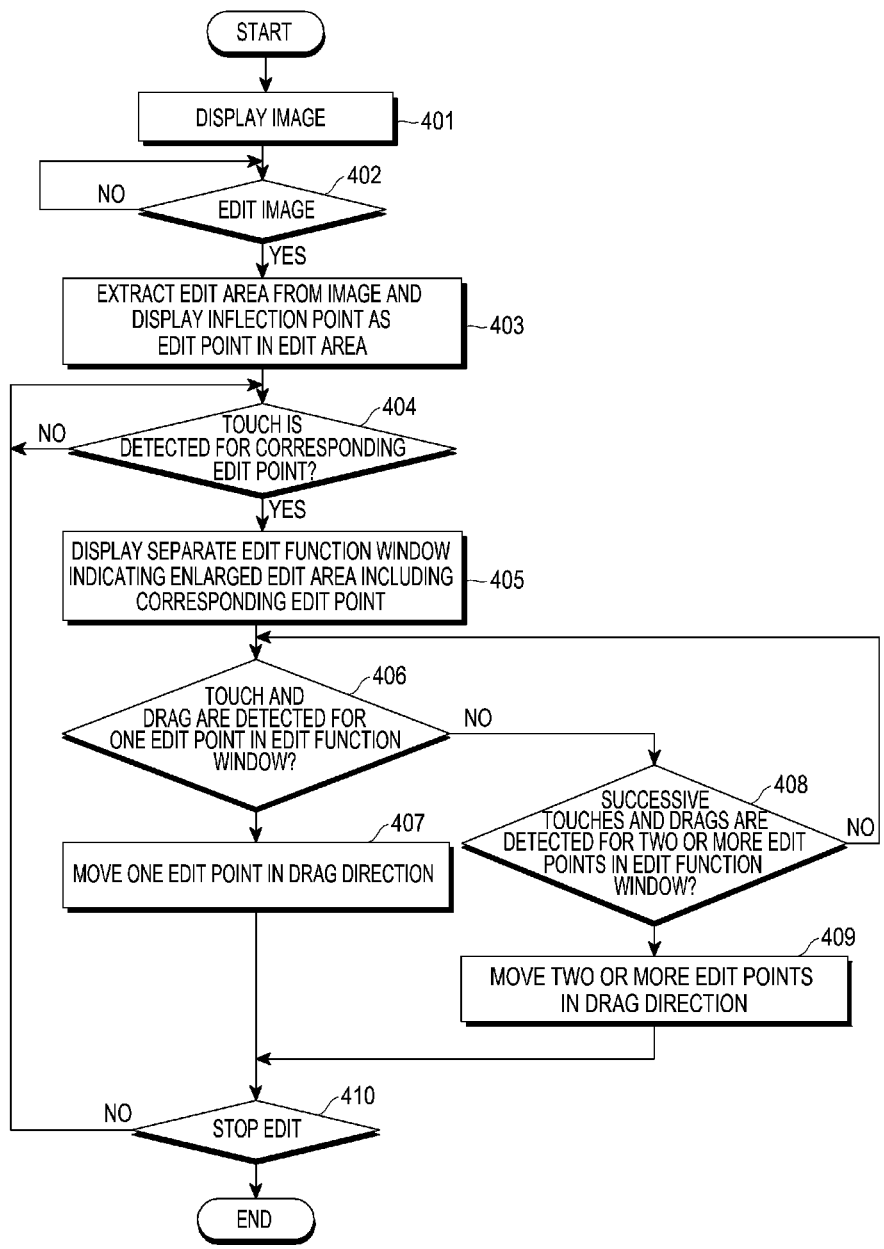
FIG. 4 is a flowchart illustrating a process of editing an image in a portable terminal according to a third exemplary embodiment of the present invention.
Figure 8A:
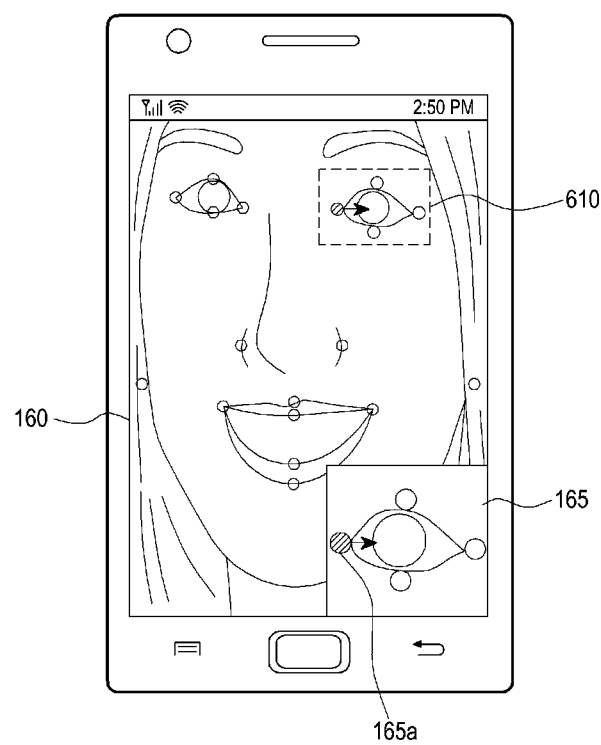
FIGS. 8A to 8B are diagrams for describing the process of FIG. 4 according to an exemplary embodiment of the present invention.
Figure 8B:
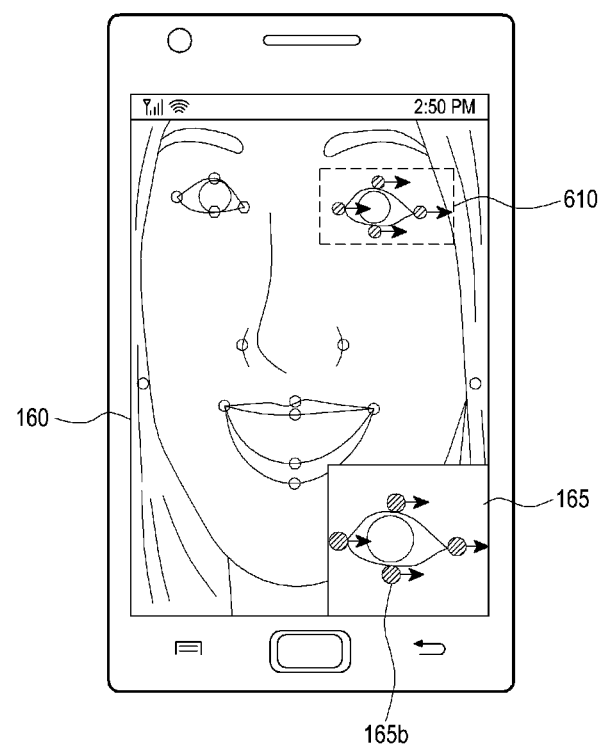

FIG. 4 is a flowchart illustrating a process of editing an image in a portable terminal according to a third exemplary embodiment of the present invention, and FIGS. 8A to 8B are diagrams for describing the process of FIG. 4.

Hereinafter, the third exemplary embodiment of the present invention will be described in detail with reference to FIG. 4 and FIG. 1.

Referring to FIG. 4, an image is displayed in the touch screen unit 160 in step 401. When an image edit is selected, the controller 110 detects the image edit in step 402. Thereafter, the controller 110 extracts one or more edit areas from the image, extracts one or more inflection points from the extracted edit areas, and controls to display the extracted one or more inflection points as the edit points in step 403.

When a touch for a corresponding edit point or a virtual selection area including predetermined areas around the corresponding edit point is detected by the controller 110 in step 404, a separate edit function window is displayed for enlarging the edit area including the corresponding edit point selected by the touch in step 405.

A size of the edit function window can be controlled by a user, and accordingly the edit area displayed in the edit function window can be displayed with a magnification of an enlargement or a reduction suitable for the user. Further, the edit function window may be displayed such that it does not overlap the edit area including the corresponding edit point that corresponds to the detected touch or may be displayed such that it overlaps the edit area.

Accordingly, when the touch or the drag is detected for one edit point in the edit function window displaying the enlarged edit area, the controller 110 detects the touch in step 406 and moves the corresponding edit point of the edit area of the image in a drag direction in step 407.

Alternatively, when a drag for a corresponding direction is detected after successive touches are detected for two or more edit points in the edit function window indicating the enlarged edit area, the controller 110 detects the drag in step 408 and proceeds to step 409 to simultaneously move the two or more edit points in a direction for which the drag has been detected in the edit area of the image.

Since the edit area itself including one or more edit points is enlarged and displayed in the edit function window, whenever a corresponding edit point included in the edit area is moved in a corresponding direction in the edit function window, the movement is directly applied to the image and displayed. Alternatively, the movement of the corresponding edit point detected in the edit function window is applied to the image and displayed at a time point when an edit for the edit area which is displayed in the edit function window is completed, that is, at a time point when the edit function window for the edit area is stopped.

If termination of the edit is selected during the above process, the controller 110 detects the termination in step 410 and stops the image edit mode.

The process of FIG. 4 is described through FIGS. 8A to 8B. In FIG. 8A, the edit function window 165 for enlarging and displaying an eye edit area 610 of a human's face image is displayed in a right end of the touch screen unit 160 in the image edit mode. Accordingly, when a drag for a right direction is detected after a touch for a corresponding edit point 165a in the edit function window 165, the controller 110 moves the corresponding edit point of the eye edit are 610 in a right direction.

In FIG. 8B, when successive touches are detected for all edit points and then a drag for a right direction is detected for an edit point 165b for which the last touch is detected in the edit function window 165 while the edit function window 165 for enlarging and displaying the edit area of the human's face image is displayed in a right end of the touch screen unit 160 in the image edit mode, the controller 110 simultaneously moves all the edit points of the eye edit area 165 in a right direction.

Figure 5:
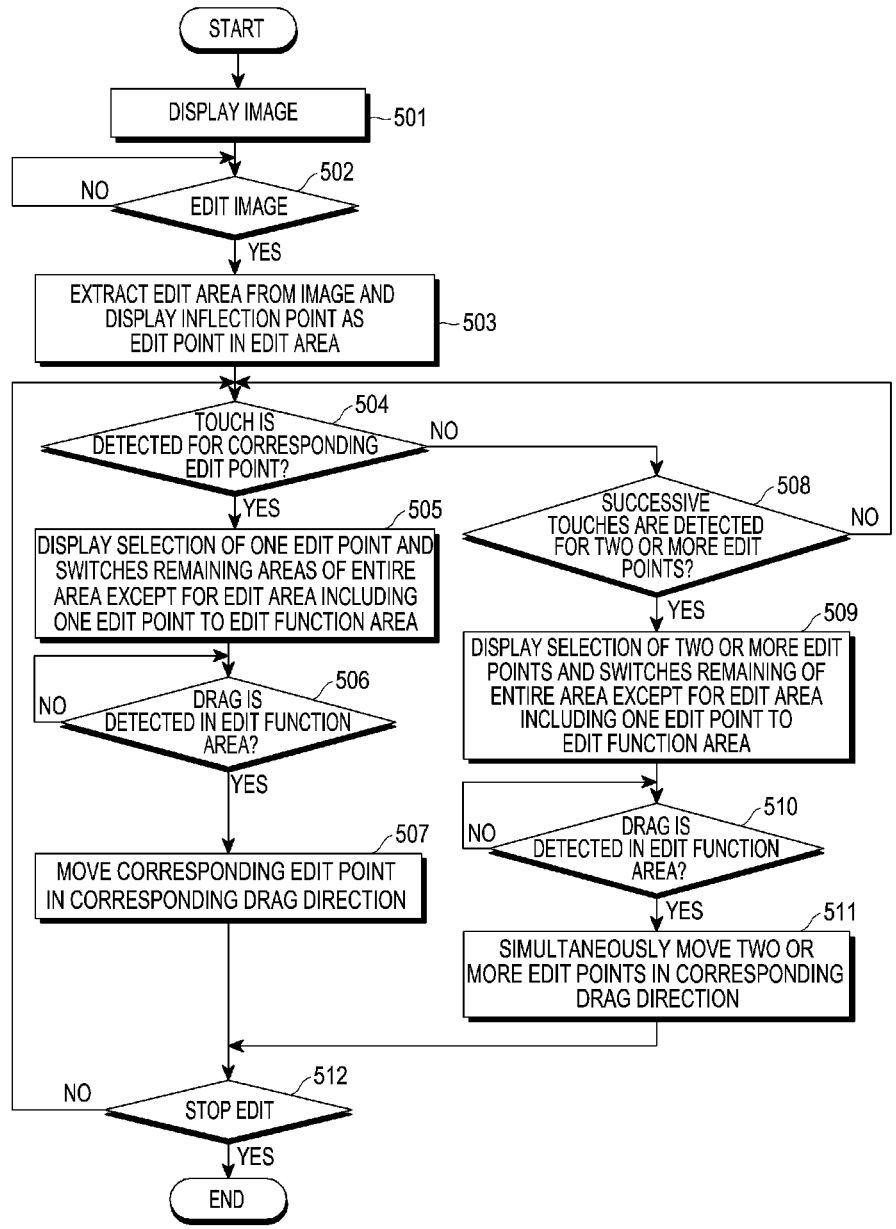
FIG. 5 is a flowchart illustrating a process of editing an image in a portable terminal according to a fourth exemplary embodiment of the present invention.
Figure 9A:
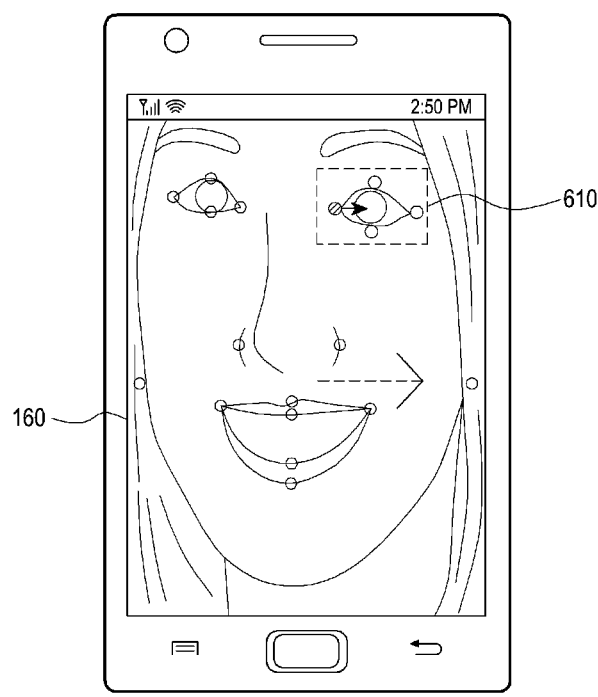
FIGS. 9A to 9B are diagrams for describing the process of FIG. 5 according to an exemplary embodiment of the present invention.
Figure 9B:
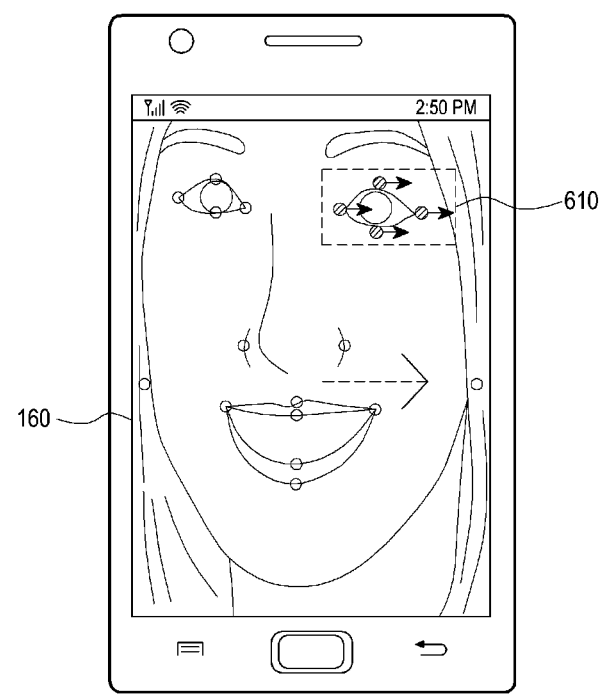

FIG. 5 is a flowchart illustrating a process of editing an image in a portable terminal according to a fourth exemplary embodiment of the present invention, and FIGS. 9A to 9B are diagrams for describing the process of FIG. 5.

Hereinafter, the fourth exemplary embodiment of the present invention will be described in detail with reference to FIG. 5 and FIG. 1.

Referring to FIG. 5, an image is displayed in the touch screen unit 160 in step 501. When an image edit is selected, the controller 110 detects the image edit in step 502. Thereafter, the controller 110 extracts one or more edit areas from the image, extracts one or more inflection points from the extracted edit areas, and controls to display the extracted one or more inflection points as edit points in step 503.

When a touch is detected for one edit point by the controller 110 in step 504, the controller 110 proceeds to step 505 to control to distinguishably display the one edit point (e.g. through a color). Further, the controller 110 switches remaining areas of the entire area of the touch screen unit 160 other than an edit area including the one edit point to edit function areas in step 505.

Further, when a drag is detected for any area of the edit function areas which are the remaining areas other than the edit area including the one edit point, the controller 110 detects the drag in step 506 and proceeds to step 507 of moving the one edit point selected in step 504 in a corresponding direction for which the drag is detected.

Alternatively, when successive touches are detected for one or more edit points by the controller 110 in step 505, the controller 110 detects the touches in step 508 and proceeds to step 509 to control to distinguishably display selections of two or more edit points (e.g., through colors). Further, the controller 110 switches remaining areas of the entire area of the touch screen unit 160 other than the edit area including the two or more edit points to the edit function area.

Further, when a drag is detected for any area of the edit function area which is the remaining areas other than the edit area including the two or more edit points, the controller 110 detects the drag in step 510 and proceeds to step 511 to simultaneously move the two or more edit points selected in step 508 in a corresponding direction for which the drag is detected.

If termination of the edit is selected during the above process, the controller 110 detects the termination in step 512 and stops the image edit mode.

The process of FIG. 5 is described through FIGS. 9A to 9B. In FIG. 9A, when a corresponding edit point of the eye edit area 610 among the human's face image is selected through a touch detected in the image edit mode, selection of the corresponding edit point selected from the eye edit area 610 is distinguishably displayed (e.g., through a color) and all remaining areas other than the eye edit area 610 are switched to the edit function area. Accordingly, when a drag for a right direction is detected in any area of the edit function areas which are the remaining areas except for the eye edit area 610, the controller 110 moves the corresponding edit point selected from the eye edit area 610 in a right direction.

In FIG. 9B, when all edit points of the eye edit area 610 among the human's face image are selected through successive touches in the image edit mode, selections of all the edit points selected from the eye edit area 610 are distinguishably displayed (e.g., through colors) and all remaining areas other than the eye edit area 610 are switched to the edit function area. Accordingly, when a drag for a right direction is detected in any area of the edit function areas which are the remaining areas other than the eye edit area 610, the controller 110 simultaneously moves all the edit points selected from the eye edit area 610 in a right direction.

Accordingly, the exemplary embodiments of the present invention have an effect of conveniently editing an image even in a small screen through the apparatus and the method for editing the image in the portable terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for editing an image in a portable terminal, the apparatus comprising:
   a touch screen configured to display an image; and
   a processor configured to, when one or more edit points are selected from edit points displayed in the image in an image edit mode, display an edit function window for editing the selected one or more edit points in the image,
   wherein the edit function window including an identifier corresponding to the selected one or more edit points and a plurality of direction keys for moving the selected one or more edit points.

2. The apparatus as claimed in claim 1, wherein, when an edit for the image is selected, the processor is configured to extract one or more edit areas from the image, and control to display one or more edit points in one or more inflection points in each edit area.

3. The apparatus as claimed in claim 1, wherein, when successive touches are detected for two or more edit points of the edit points displayed in the image, the processor is configured to control such that a separate edit function window including a plurality of direction keys for simultaneously moving the two or more edit points in a corresponding direction is displayed.

4. The apparatus as claimed in claim 1, wherein the processor is configured to control such that the edit function window is displayed in a position which does not overlap an edit area including the selected edit point.

5. The apparatus as claimed in claim 1, wherein, when a touch is detected for one edit point of the edit points displayed in the image, the processor is configured to control such that a plurality of direction keys for moving the one edit point in a corresponding direction are displayed in corresponding areas of an entire screen area of the touch screen unit, respectively.

6. The apparatus as claimed in claim 1, wherein, when successive touches are detected for two or more edit points of the edit points displayed in the image, the processor is configured to control such that a plurality of direction keys for simultaneously moving the two or more edit points in a corresponding direction are displayed in corresponding areas of an entire screen area of the touch screen unit, respectively.

7. The apparatus as claimed in claim 1, wherein, when a touch is detected in a virtual selection area including predetermined areas around a particular edit point in the image edit mode, the processor is configured to control such that the edit point included in the virtual selection area is selected.

8. An apparatus for editing an image in a portable terminal, the apparatus comprising:
   a touch screen configured to display an image; and
   a processor configured to control to:
      when a corresponding edit point is selected from edit points displayed in the image in an image edit mode, display one or more edit points distinguishably through an identifier in an edit area including the corresponding edit point, and
      when one or more identifiers are selected in the edit area, display an edit function window for editing the selected one or more identifiers in the image,
   wherein the edit function window includes the selected one or more identifiers and a plurality of direction keys for moving the selected one or more identifiers.

9. The apparatus as claimed in claim 8, wherein, when an edit for the image is selected, the processor is configured to extract one or more edit areas from the image, and control to display one or more edit points in one or more inflection points in each edit area.

10. The apparatus as claimed in claim 8, wherein a touch is detected for one identifier in the edit area in which the one or more edit points are distinguishably displayed through the identifier.

11. The apparatus as claimed in claim 8, wherein, when successive touches are detected for two or more identifiers in the edit area in which the one or more edit points are distinguishably displayed through the identifier, the processor is configured to control such that a separate edit function window including a plurality of direction keys for simultaneously moving the two or more identifiers in a corresponding direction is displayed.

12. The apparatus as claimed in claim 8, wherein the processor is configured to control such that the edit function window is displayed in a position which does not overlap the edit area in which the one or more edit points are distinguishably displayed through the identifier.

13. The apparatus as claimed in claim 8, wherein, when a touch is detected for one identifier in the edit area in which the one or more edit points are distinguishably displayed through the identifier, the processor is configured to control such that a plurality of direction keys for moving one edit point in a corresponding direction are displayed in corresponding areas of an entire screen area of the touch screen unit, respectively.

14. The apparatus as claimed in claim 8, wherein, when successive touches are detected for two or more identifiers in the edit area in which the one or more edit points are distinguishably displayed through the identifier, the processor is configured to control such that a plurality of direction keys for simultaneously moving the two or more identifiers in a corresponding direction are displayed in corresponding areas of an entire screen area of the touch screen, respectively.

15. The apparatus as claimed in claim 8, wherein, when a touch is detected in a virtual selection area including predetermined areas around a particular edit point in the image edit mode, the processor is configured to control such that the edit point included in the virtual selection area is selected.

16. An apparatus for editing an image in a portable terminal, the apparatus comprising:
   a touch screen configured to display an image; and
   a processor configured to control to:
      when a corresponding edit point is selected from edit points displayed in the image in an image edit mode, enlarge an edit area including the corresponding edit point, and
      display the enlarged edit area as an edit function window,
   wherein the edit function window includes an identifier corresponding to the selected one or more edit points and a plurality of direction keys for moving the selected edit point.

17. The apparatus as claimed in claim 16, wherein, when an edit for the image is selected, the processor is configured to extract one or more edit areas from the image, and control to display one or more edit points in one or more inflection points in each edit area.

18. The apparatus as claimed in claim 16, wherein the processor is configured to control such that, when a touch and a drag are detected for one edit point in the edit function window, the one edit point is moved in a corresponding drag direction, and control such that, when successive touches and drags are detected for two or more edit points, the two or more edit points are simultaneously moved in a corresponding drag direction.

19. The apparatus as claimed in claim 16, wherein, when a touch is detected in a virtual selection area including predetermined areas around a particular edit point in the image edit mode, the processor is configured to control such that the corresponding edit point included in the virtual selection area is selected.

20. An apparatus for editing an image in a portable terminal, the apparatus comprising:
   a touch screen configured to display an image; and
   a controller configured to, when one or more edit points are selected from edit points displayed in the image, switch remaining areas of an entire screen area of the touch screen unit except for an edit area including the selected one or more edit points to an edit function area for editing the selected one or more edit points,
   wherein the edit function area includes a plurality of direction keys for moving the selected edit point, each of the direction key includes an identifier corresponding to the selected one or more edit points.

21. The apparatus as claimed in claim 20, wherein, when an edit for the image is selected, the processor is configured to extract one or more edit areas from the image, and control to display one or more edit points in one or more inflection points in each edit area.

22. The apparatus as claimed in claim 20, wherein the processor is configured to control such that, when a touch is detected for one edit point of edit points displayed in the image, a selection of the one edit point is distinguishably displayed, and control such that, when a drag is detected in the edit function area, the one edit point is moved in a drag direction and displayed.

23. The apparatus as claimed in claim 20, wherein the processor is configured to control such that, when successive touches are detected for two or more edit points of edit points displayed in the image, selections of the two or more edit points are distinguishably displayed, and control such that, when a drag is detected in the edit function area, the two or more edit points are simultaneously moved in a drag direction and displayed.

24. The apparatus as claimed in claim 20, wherein, when a touch is detected in a virtual selection area including predetermined areas around a particular edit point in the image edit mode, the processor is configured to control such that the corresponding edit point included in the virtual selection area is selected.

25. A method of editing an image in a portable terminal, the method comprising:
   displaying edit points in an image in an image edit mode; and
   when one or more edit points are selected from the displayed edit points, displaying an edit function window for editing the selected one or more edit points in the image,
   wherein the edit function window includes an identifier corresponding to the selected one or more edit points and a plurality of direction keys for moving the selected one or more edit points.

26. The method as claimed in claim 25, wherein the displaying of the edit points in the image comprises:
   extracting one or more edit areas from the image in the image edit mode;
   extracting one or more inflection points from each edit area; and
   displaying the one or more inflection points as edit points.

27. The method as claimed in claim 25, wherein the displaying of the edit function window comprises:
   when a touch is detected for one edit point of the edit points displayed in the image, displaying a separate edit function window including a plurality of direction keys for moving the selected one edit point in a corresponding direction; and
   when a corresponding direction key is selected from the plurality of direction keys in the edit function window, moving the selected one edit point in a direction corresponding to the selected corresponding direction key and displaying the moved edit point.

28. The method as claimed in claim 25, wherein the displaying of the edit function window comprises:
   when successive touches are detected for two or more edit points of the edit points displayed in the image, displaying a separate edit function window including a plurality of direction keys for simultaneously moving the two or more edit points in a corresponding direction; and when a corresponding direction key is selected from the plurality of direction keys in the edit function window, simultaneously moving the two or more edit points in a direction corresponding to the selected corresponding direction key and displaying the moved edit points.

29. The method as claimed in claim 25, further comprising displaying the edit function window in a position which does not overlap an edit area including the selected edit point.

30. The method as claimed in claim 25, further comprising:

when a touch is detected for one edit point of the edit points displayed in the image, displaying a plurality of direction keys for moving the selected one edit point in a corresponding direction in corresponding areas of an entire screen area of a touch screen unit, respectively; and when a corresponding direction key is selected from the plurality of direction keys displayed in the touch screen unit, moving the selected one edit point in a direction corresponding to the selected corresponding direction key and displaying the moved edit point.

31. The method as claimed in claim 25, further comprising:

when successive touches are detected for two or more edit points of the edit points displayed in the image, displaying a plurality of direction keys for simultaneously moving the two or more edit points in a corresponding direction in corresponding areas of an entire screen area of a touch screen unit, respectively; and when a corresponding direction key is selected from the plurality of direction keys displayed in the touch screen unit, moving the selected two or more edit points in a direction corresponding to the selected corresponding direction key and displaying the moved edit points.

32. The method as claimed in claim 25, further comprising, when a touch is detected in a virtual selection area including predetermined areas around a particular edit point in the image edit mode, selecting the edit point included in the virtual selection area.

33. A method of editing an image in a portable terminal, the method comprising:

displaying edit points in an image in an image edit mode;

when a corresponding edit point is selected from the displayed edit points, distinguishably displaying one or more edit points through an identifier in an edit area including the corresponding edit point; and when one or more identifiers are selected from the edit area, displaying an edit function window for editing the selected one or more identifiers in the image, wherein the edit function window includes the selected one or more identifiers and a plurality of direction keys for moving the selected one or more identifiers.

34. The method as claimed in claim 33, wherein the displaying of the edit points in the image comprises:

extracting one or more edit areas from the image in the image edit mode;

extracting one or more inflection points from each edit area; and displaying the one or more inflection points as edit points.

35. The method as claimed in claim 33, wherein the displaying of the edit function window comprises:

when a touch is detected for one identifier in the edit area in which the one or more edit points are distinguishably displayed through the identifier, displaying a separate edit function window including a plurality of direction keys for moving one edit point in a corresponding direction; and when a corresponding direction key is selected from the plurality of direction keys in the edit function window, moving the one identifier in a direction corresponding to the selected corresponding direction key and displaying the moved identifier.

36. The method as claimed in claim 33, wherein the displaying of the edit function window comprises:

when successive touches are detected for two or more identifiers in the edit area in which the one or more edit points are distinguishably displayed through the identifier, displaying a separate edit function window including a plurality of direction keys for simultaneously moving two or more edit points in a corresponding direction; and when a corresponding direction key is selected from the plurality of direction keys in the edit function window, simultaneously moving the two or more identifiers in a direction corresponding to the selected corresponding direction key and displaying the moved identifiers.

37. The method as claimed in claim 33, further comprising displaying the edit function window in a position which does not overlap the edit area in which the one or more edit points are distinguishably displayed through the identifier.

38. The method as claimed in claim 33, further comprising:

when a touch is detected for one identifier in the edit area in which the one or more edit points are distinguishably displayed through the identifier, displaying a plurality of direction keys for moving one edit point in a corresponding direction in corresponding areas of an entire screen area of a touch screen unit, respectively; and when a corresponding direction key is selected from the plurality of direction keys displayed in the touch screen unit, moving the one identifier in a direction corresponding to the selected corresponding direction key and displaying the moved identifier.

39. The method as claimed in claim 33, further comprising:

when successive touches are detected for two or more identifiers in the edit function window in which the one or more edit points are distinguishably displayed through the identifier, displaying a plurality of direction keys for simultaneously moving the two or more edit points in a corresponding direction in corresponding areas of an entire screen area of a touch screen unit, respectively; and when a corresponding direction key is selected from the plurality of direction keys displayed in the touch screen unit, simultaneously moving the two or more identifiers in a direction corresponding to the selected corresponding direction key and displaying the moved identifiers.

40. The method as claimed in claim 33, further comprising, when a touch is detected in a virtual selection area including predetermined areas around a particular edit point in the image edit mode, selecting the edit point included in the virtual selection area.

41. A method of editing an image in a portable terminal, the method comprising:

displaying edit points in an image in an image edit mode; and when one edit point is selected from the displayed edit points, enlarging an edit area including the corresponding edit point and displaying the enlarged edit area as an edit function window, wherein the edit function window includes an identifier corresponding to the selected one or more edit points and a plurality of direction keys for moving the selected edit point.

42. The method as claimed in claim 41, wherein the displaying of the edit points in the image comprises:

extracting one or more edit areas from the image in the image edit mode;

extracting one or more inflection points from each edit area; and displaying the one or more inflection points as edit points.

43. The method as claimed in claim 41, further comprising:

when a touch and a drag are detected for one edit point in the edit function window, moving the one edit point in a corresponding drag direction and displaying the moved edit point; and when successive touches and drags are detected for two or more edit points in the edit function window, simultaneously moving the two or more edit points in a corresponding drag direction and displaying the moved edit points.

44. The method as claimed in claim 41, further comprising, when a touch is detected in a virtual selection area including predetermined areas around a particular edit point in the image edit mode, selecting the edit point included in the virtual selection area.

45. A method of editing an image in a portable terminal, the method comprising:

displaying edit points in an image in an image edit mode;

when one or more edit points are selected from the displayed edit points, extracting remaining areas of an entire screen area of a touch screen unit except for an edit area including the selected one or more edit points; and switching the remaining areas except for the edit area to an edit function area for editing the selected one or more edit points, wherein the edit function area includes a plurality of direction keys for moving the selected edit point, each of the direction key includes an identifier corresponding to the selected one or more edit points.

46. The method as claimed in claim 45, wherein the displaying of the edit points in the image comprises:

extracting one or more edit areas from the image in the image edit mode;

extracting one or more inflection points from each edit area; and displaying the one or more inflection points as edit points.

47. The method as claimed in claim 45, further comprising:

when a touch is detected for one edit point of the edit points displayed in the image, distinguishably displaying a selection of the one edit point; and when a drag is detected in the edit function area, moving the one edit point in a drag direction and displaying the moved edit point.

48. The method as claimed in claim 45, further comprising:

when successive touches are detected for two or more edit points of the edit points displayed in the image, distinguishably displaying selections of the two or more edit points; and when a drag is detected in the edit function area, moving the two or more edit points in a drag direction and displaying the moved edit points.

49. The method as claimed in claim 45, further comprising, when a touch is detected in a virtual selection area including predetermined areas around a particular edit point, selecting the edit point included in the virtual selection area.

* * * * *